W. F. HUDSON.
CRANK CASE REPAIR ARM.
APPLICATION FILED OCT. 28, 1919.
1,371,622.
Patented Mar. 15, 1921.
2 SHEETS—SHEET 1.
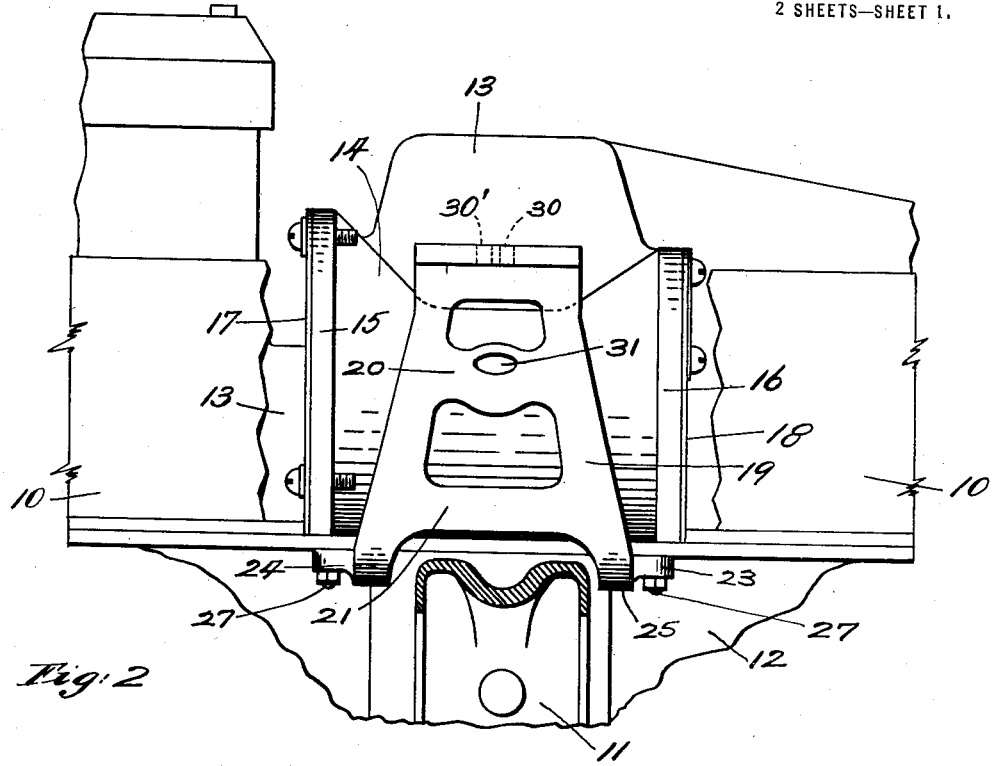
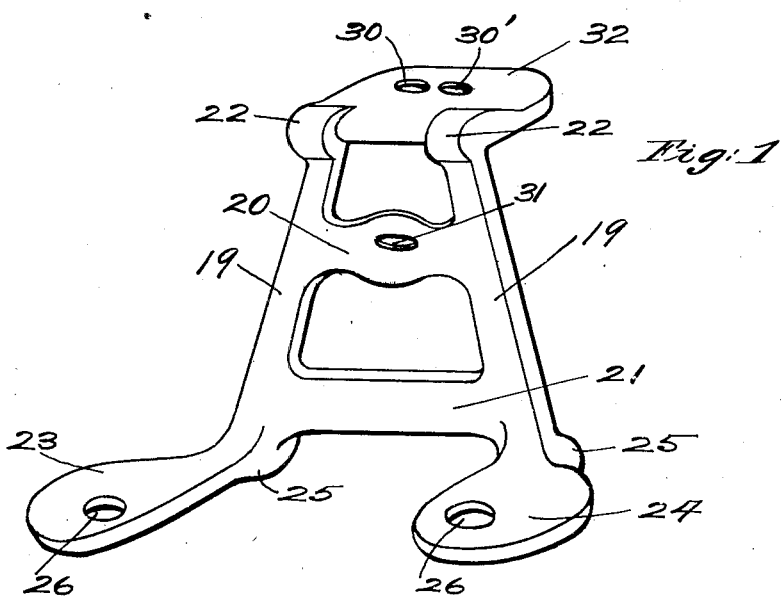
INVENTOR.
William F. Hudson.
BY
ATTORNEY.

UNITED STATES PATENT OFFICE.

WILLIAM F. HUDSON, OF PHILADELPHIA, PENNSYLVANIA.

CRANK-CASE REPAIR-ARM.

1,371,622.     Specification of Letters Patent.     Patented Mar. 15, 1921.

Application filed October 28, 1919. Serial No. 333,916.

*To all whom it may concern:*

Be it known that I, WILLIAM F. HUDSON, a citizen of the United States, residing in the city of Philadelphia, county of Philadelphia, and State of Pennsylvania, have invented certain new and useful Improved Crank-Case Repair-Arms, of which the following is a specification.

This invention relates to an improvement upon the device shown, described and claimed in U. S. Letters Patent granted to Anthony Gerosa, under date of April 23rd, 1918, and numbered 1,263,879.

The device referred to in said patent is designed for use upon a popular make of motor-vehicle, which heretofore has not been equipped with a self-starter. However, with the advent of a "new model," such motor-vehicles are now fashioned for the reception of self-starting mechanism. According to the old type of motor-vehicle, both sides of the crank-case thereof are of the same configuration, so that the repair arm illustrated in said patent is capable of use upon either side of the said casing. According to the new type of motor-vehicle, however, the crank-case upon the driver's side of the vehicle, is extended outwardly toward a side-rail or beam of the vehicle chassis, so that comparatively little space lies therebetween. Further, the extended portion of the said crank-case is provided with flanged ends, which, together with said contracted space, precludes the application of aforesaid repair arm upon the driver's side of said new type of motor-vehicle. Obviously, the old type of repair arm may be employed upon the right-hand side of the new type of motor-vehicle, but this necessitates handling in the trade of "rights" and "lefts," which is undesirable. Extended practice of the Gerosa invention discloses that the supporting lugs of a crank-case of the type under consideration, are not centrally disposed between the bolt-holes utilized when connecting to place said repair arm. Instead, these lugs are positioned nearer to the rearward than to the forward bolt-holes. While the distance is relatively small, nevertheless, when working in the small space afforded upon the left-hand side of a vehicle chassis, an accurate adjustment of repair arms must be had. Consequently, the old form of repair arm, in addition to not being shaped and proportioned for use in connection with a motor-vehicle equipped with self-starting mechanism, is not reversible.

The leading object of the present invention, may be said to be to provide a repair arm, which is capable of application to a crank-case having self-starting accommodating means complemental thereto, and which is reversible in form, so as to be capable of application upon either side of a crank-case.

With said leading and other objects in view the invention consists of the improvements hereinafter described and finally claimed.

The nature, characteristic features and scope of the invention will be more fully understood from the following description taken in connection with the accompanying drawings forming part hereof, and in which:

Figure 1, is a perspective view of my improved repair-arm.

Fig. 2, is a fragmentary view in elevation illustrating the application of my improved repair arm to a crank-casing.

Figure 3:
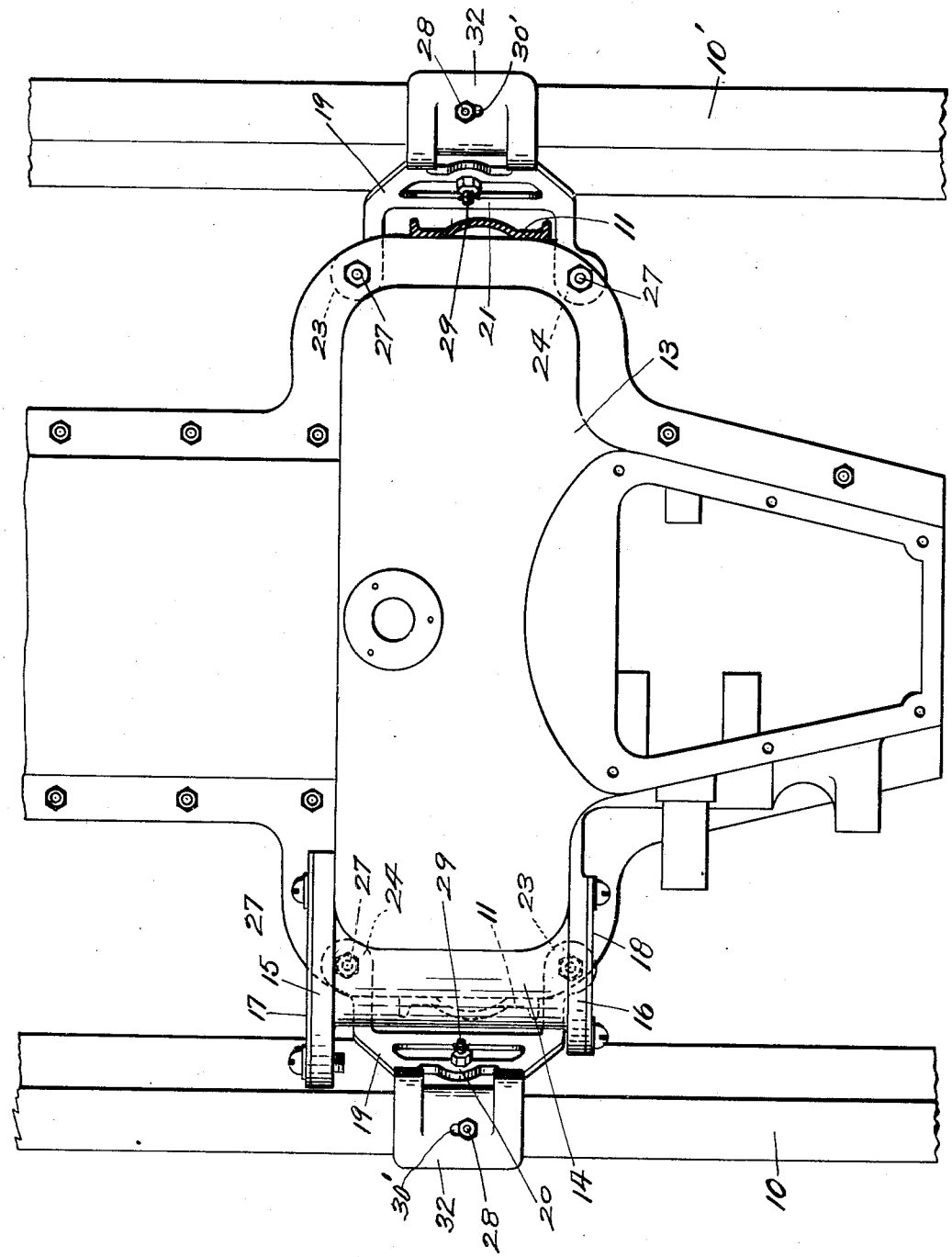
Fig. 3, is a view in plan of the parts shown in Fig. 2.

For the purpose of illustrating my invention, I have shown in the accompanying drawings one form thereof which is at present preferred by me, since the same has been found in practice to give satisfactory and reliable results, although, it is to be understood that the various instrumentalities of which my invention consists can be variously arranged and organized, and that my invention is not limited to the precise arrangement and organization of the instrumentalities as herein shown and described.

In the drawings and referring to Figs. 2 and 3, 10 and 10' designate the side rails or beams of a motor-vehicle chassis which may be of pleasure-car or of commercial type. One-half of the two-part transmission or crank-casing is supported from said side rails by lugs or ears 11, shown for illustrative purposes as being "broken off" in the drawings. The other side of said casing is super-imposed thereon and the flanged portions of said casing are bolted together as is well understood in the art. In the "new model" previously referred to, the lower portion 12, of the crank-case remains the same as heretofore, but the upper portion 13, of said casing is provided upon the driver's side of the vehicle with an auxiliary casing 14, designed for containing self-starting mechanism. The forward and rearward ends of said auxiliary casing are vertically flanged as at 15 and 16, and closed by suitable cover-plates 17 and 18. The auxiliary casing and its flanges overlie the lower part of the transmission or crank-casing upon the driver's side of a vehicle and are in close proximity to the rail 10, so that little space intervenes. Heretofore, when substituting the device shown in the aforesaid patent for a broken lug 11, ample clearance was present as shown at the right-hand side of Fig. 3. However, with the adoption of the self-starting feature, sufficient clearance is not present upon the driver's side of a motor-vehicle for the insertion of said patented device. According to the present invention, however, I employ a repair arm which is adapted for application upon either side of a crank-casing. Such arm is illustrated in Fig. 1, which briefly stated, comprises a vertical body portion adapted to be placed along the inside of a chassis beam, an upper horizontal portion extended outwardly from said body so as to overlie a chassis beam and a lower horizontal forked portion extended inwardly from said body, so as to support the transmission casing. The body portion may be of any desired configuration, although, in practice I employ a pair of sloping legs 19, connected by horizontal ribs 20 and 21. The upper portion consists of a plate 32 extended from the upper sides of said legs the juncture points of said legs and plate being reinforced as at 22. The lower portion consists of a pair of feet 23 and 24, extended inwardly from the lower ends of said legs. The juncture points of said legs and feet are reinforced at 25. These feet are substantially disk-shaped and have unobstructed space there-between throughout their extent in order to engage around a broken off lug 11. Each foot is provided with bolt-holes 26. The base line of the body portion measures appreciably less than does the distance between the flanges of the auxiliary casing and the spread of said feet substantially equals the distance between the flanges of the auxiliary casing 14. In placing the arm upon the driver's side of a vehicle, it is necessary to position the body portion parallel with the side rail 10 and move the arm endwise between said beam and auxiliary casing. When the feet 23 and 24 straddle the broken lug 11, bolts 27 are passed through the holes in said feet for securing the same with respect to the transmission casing. A bolt 28 is employed to secure the upper plate of the arm to the side rail 10 and a bolt 29 is employed to secure the body portion of the arm to said rail. For this purpose the top plate and body are apertured. I prefer to provide two apertures 30—30' in the top plate, and a slot 31 in the body portion. This is so that the arm may be used upon either side of the crank-casing. An inspection of Fig. 2, discloses that the lugs 11 are not positioned centrally of the bolt holes in the transmission-casing and the side rails which receive the bolts 27, 28 and 29. When the feet of a repair arm straddle a lug upon the driver's side of a vehicle the vertical axis or center line of the repair arm is slightly to the rear of the centers of the bolt holes in the side of the rail 10. Obviously the slot 31 may be replaced by two bolt holes and the bolt holes 30—30' may be in the form of a slot if desired. When the repair arm is reversed for use upon the right hand side of a vehicle obviously bolt hole 30' is in register with the bolt hole in the top of the side rail 10'. By this construction one type of repair arm may be employed upon either side of a crank-casing the advantage of which is readily apparent.

It will now be apparent that I have devised a novel and useful construction which embodies the features of advantage enumerated as desirable in the statement of the invention, and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. In a motor vehicle construction, the combination with chassis side-rails having conventionally spaced bolt holes, a transmission casing having conventionally spaced bolt holes said casing being provided at one side with a compartment for containing self-starting mechanism, said compartment having flanged ends disposed in juxtaposition to and at right angles with a chassis side-rail, a lug carried at each side of said casing and secured to a chassis side-rail, of a repair arm for supporting said casing in the event of breakage of a lug, said arm comprising a body arranged to fit between the flanges of said compartment said body having an outwardly extended member at its upper portion for engaging over a chassis side-rail which member is apertured said aperture being so shaped and proportioned as to extend laterally well beyond each side of the vertical axis of the arm so that said arm may be fitted to either side of the transmission casing to have said aperture register with a side-rail bolt hole, said body further having inwardly extended, apertured feet which project laterally well beyond the body base line so as to have an aperture of each lug aline with those bolt holes of the transmission casing positioned substantially beneath the flanges of said compartment and bolts for securing said arm to place.

2. A crank-case repair arm comprising a vertical body, an outwardly extended member at the upper portion of said body said body and member being apertured which apertures are so shaped and proportioned as to extend laterally well beyond each side of the vertical axis of the repair arm to render said arm capable of reversible employment, reinforcing enlargements at the juncture of said body and member, inwardly extended apertured feet at the lower portion of said body said feet projecting laterally well beyond the base-line of said body and being of disk-like symmetrical configuration and reinforcement enlargements at the juncture of said body and feet.

In witness whereof I have hereunto signed my name.

WILLIAM F. HUDSON.